United States Patent [19]
Michalski

[11] 3,876,576

[45] Apr. 8, 1975

[54] DRIFT CONTROL FOR RESINOUS BINDERS

[75] Inventor: Raymond J. Michalski, Riverdale, Ill.

[73] Assignee: Nalco Chemical Company, Chicago, Ill.

[22] Filed: Feb. 8, 1973

[21] Appl. No.: 330,664

[52] U.S. Cl. ...... 260/29.2 UA; 117/100 C; 260/9 R; 260/17 R; 260/22 CB; 260/29.2 N; 260/29.6 H
[51] Int. Cl. ...................... B01d 47/00; C09d 3/26
[58] Field of Search... 260/22 CB, 29.2 UA, 29.6 H; 117/100 C

[56] References Cited
UNITED STATES PATENTS

| | | | |
|---|---|---|---|
| 2,625,529 | 1/1953 | Hedrick et al. | 260/41 |
| 3,069,293 | 12/1962 | Booth | 117/100 C |
| 3,515,575 | 6/1970 | Arnold | 117/102 |
| 3,624,019 | 11/1971 | Anderson | 260/29.6 H |
| 3,708,319 | 1/1973 | Nimerick et al. | 260/29.6 H |
| 3,761,433 | 9/1973 | High | 260/29.2 UA |

*Primary Examiner*—Ronald W. Griffin
*Attorney, Agent or Firm*—Johnston, Keil, Thompson & Shurtleff

[57] ABSTRACT

In the processing of mineral solids by the addition thereto of aqueous systems containing resinous binders to stabilize the surfaces of such mineral solids against the erosive action of wind and water, water soluble polymers formed by the polymerization of at least one monoolefinic compound through an aliphatic unsaturated group and having a molecular weight of at least 100,000 are added to the aqueous systems containing the binders in order to control the drift when such aqueous systems are applied by spraying or otherwise to such mineral solids.

3 Claims, No Drawings

1

DRIFT CONTROL FOR RESINOUS BINDERS

BACKGROUND

It is known in the art to apply emulsions of elastomeric substances and also to apply emulsions of resins to finely divided ores, coal, mineral concentrates, mineral fines, flotation tailings, cyanidation tailings, and the like, to stabilize such mineral substances against erosive action of wind and water. Usually elastomers are applied in latex form, i.e., a dispersion of a synthetic polymer or copolymers in an aqueous medium such as that ordinarily obtained by an emulsion polymerization process. Other resinous polymers or copolymers such as alkyd resins are usually applied to the surfaces of such mineral substances in the form of an emulsion. Elastomers and other types of resinous substances employed for this purpose are usually referred to as binders. They must be capable of forming a continous film and they must be water insoluble after they have been applied as a coating to the mineral substances. The application of these binders is usually carried out by spraying a liquid, preferably an aqueous liquid containing the binder on the mineral substance to be treated.

After the binders have been applied to the surface of the mineral products a resultant film is produced which keeps the surfaces in contact and consequently erosion thereof due to wind or water during shipment or upon storage in open areas is substantially completely eliminated.

One of the problems encountered in this method of erosion control of mineral products is the fogging and drift which occurs during the application of the binder to the mineral solids which not only causes loss of the binder but results in the formation of a coating of the binder on surrounding areas. If equipment is present in these areas it may in time become unusable until the surface has been cleaned in order to remove the binders. If the areas contain vegetation, the vegetation may be destroyed and the area will no longer be suitable for the growth of vegetation. Many of these binders are not biodegradable and therefore once the area is contaminated it may be difficult to make it usable for growing crops or other vegetation.

OBJECTS

One of the objects of this invention is to provide a new and improved process for controlling drift of aqueous systems of resinous binders in the application of such binders to mineral products for the purpose of stabilizing the surfaces of such mineral products.

Another object of the invention is to provide a process of the type described which is relatively simple and merely entails the addition of one or more chemicals to an aqueous system of a resinous binder without substantially changing the characteristics and the effectiveness of such system. Other objects will appear hereinafter.

BRIEF SUMMARY OF THE INVENTION

The invention provides a method of controlling drift of aqueous system of resinous binders in the application of such systems to mineral solids, for example, by spraying, by incorporating with said aqueous system a drift controlling but substantially non-viscosity increasing amount of a water soluble polymer formed by the polymerization of at least one monoolefinic compound through an aliphatic unsaturated group and having a molecular weight of at least 100,000.

DETAILED DESCRIPTION OF THE INVENTION

The water soluble polymers which are employed as drift control agents in the practice of the invention are obtained by the polymerization of at least one monoolefinic compound through an aliphatic unsaturated group and have a molecular weight of at least 100,000, preferably at least 300,000. In many instances, the molecular weights of the polymer additives range as high as 1–10 million or more. To be effective for the purpose of the invention these polymers must be water dispesible or water soluble. To this end they normally have a linear hydrocarbon structure containing in a side chain a hydrophilic group from the class consisting of carboxylic acid, carboxylic acid anhydride, carboxylic acid amide, hydroxy, pyridine, pyrrolidone, hydroxyalkyl ether, carboxylic acid salt groups and mixtures of said groups. They can be homopolymers or copolymers.

Broadly speaking, the polymer treating agents which are effective for reducing drift or aqueous binders fall into three classes; namely, (1) those consisting of polymeric organic substances which in an aqueous medium will form organic anions having a substantial number of negative electrical charges distributed at a plurality of positions on the polymer; (2) those consisting of polymeric organic substances which in an aqueous medium will form organic cations having a substantial number of positive charges distributed at a pluality of positions on the polymer; and (3) those consisting of polymeric organic substances which in an aqueous medium will not form ions but nevertheless contain a sufficient number of hydrophilic groups to be water-dispersible. The first class of materials is referred to herein as anionic organic polymers, the second class is referred to herein as cationic organic polymers, and the third class is referred to herein as non-ionic organic polymers. The first two classes can also be referred to as polyelectrolytes.

The term "polyelectrolyte" is intended to cover synthetic organic polymers which in an aqueous medium will form organic ions having a substantial number of electrical changes distributed at a plurality of positions.

The synthetic organic polymers containing only carboxylic acid, carboxylic acid anhydride, and carboxylic acid salt groups in a side chain are anionic. The synthetic organic polymers containing only pyridine or other similar nitrogen-containing nuclei are cationic. The synthetic organic polymers containing only a carboxylic acid amide, pyrrolidone, a hydroxy, a hydroxy alkyl ether and/or an alkoxy group in a side chain are non-ionic. The invention contemplates the employment of polymers which contain anionic, cationic and/or non-ionic groups. It also contemplates the employment of mixtures of anionic, cationic and/or non-ionic water-dispersible synthetic organic polymers.

The following synthetic organic polymers and their characteristic groupings illustrate the types of polymers which have been found to be effective for the practice of the invention: polyacrylate sodium salt, polymethacrylic acid sodium salt, maleic anhydride-vinyl acetate copolymer, polyvinyl methyl ethermaleic anhydride, methacrylic acid-acrylamide copolymer, polyacrylic acid, isopropenyl acetate-maleic anhydride sodium salt copolymer, itaconic acid-vinyl acetate copolymer, polyvinyl pyridine-hydrochloride, α-methyl styrene-maleic anhydride sodium salt copolymer, polyvinyl pyrrolidone, styrene-maleic anhydride sodium salt copolymer, polyvinyl alcohol, polyvinyl methyl ether, methylmethacrylate-maleic anhydride sodium salt copolymer, polyvinyl acetate emulsion, and acrylic acid-styrene copolymer.

Any of the polyelectrolytes disclosed in U.S. Pat. No. 2,625,529 can be employed for the purpose of the invention. When the copolymers are identified in terms of their monomeric constituents, it should be understood that the names applied to these copolymers refer to the molecular structure and are not limited to the polymers prepared by the copolymerization of specific monomers. In many cases, the identical copolymers can be prepared from other monomers and converted by subsequent chemical reaction to the desired copolymer.

Where the copolymer is derived from a polycarboxylic acid derivative and at least one other monomer copolymerizable therewith, the polycarboxylic acid derivative may be maleic anhydride, maleic acid, fumaric acid, itaconic acid, aconitic acid, citraconic acid, the amides of these acids, the alkali metal (e.g., sodium, potassium and lithium), the alkaline earth metal (e.g., magnesium, calcium, barium and strontium), and ammonium salts of these acids, the partial alkyl esters (e.g., methyl, ethyl, propyl, butyl, mono esters), the salts of said partial alkyl esters, and the substituted amides of these polycarboxylic acids. Where the hydrophilic maleic acid derivatives are used as one of the starting components to form the copolymer, the hydrophobic comonomers may be, for example, styrene, alphamethylstyrene, vinyl toluene, chlorostyrene, vinyl acetate, vinyl chloride, vinyl formate, vinyl alkyl ethers, alkyl acrylates, alkyl metacrylates, ethylene, propylene, and/or isobutylene.

The foregoing synthetic copolymers are preferably obtained by reacting equimolar proportions of a polycarboxylic acid derivative and at least one other monomer. However, certain of the hydrophilic derivatives of unsaturated polycarboxylic acids can be polymerized in less than equimolar proportions with some of the less hydrophobic comonomers, for example, vinyl formate and vinyl acetate.

In addition to homopolymers and copolymers of any of the just mentioned monomers, combinations thereof or others, terpolymeric substances may likewise be usually employed in reducing mist of sprayed binders. A greatly preferred group includes polymerized acrylamide as one of the components of either a copolymer of terpolymer. Usually the copolymer or terpolymer contains acrylamide as a major ingredient. Greatly preferred polymers include acrylamide-acrylic acid copolymers, and acrylamide-maleic acid-methacrylic terpolymers.

In addition to the above described results with cationic and anionic organic materials, highly desirable results can be obtained when high molecular weight ethylene oxide polymers are used. These polymers have a viscosity in centipoises at 25°C., of from 500 to 30,000 when made up on one-half to five percent aqueous solutions. For best results, such polymers should have molecular weights in excess of one million. The lower molecular weight materials have molecular weights starting about 200,000. These polymers are prepared by heating appropriate quantities of ethylene oxide with initiating molecules such as ethanol, ethylene glycol and the like in a sealed tube for six hours or more in the presence of a catalyst. Suitable catalysts include alkaline earth metal carbonates such as strontium or calcium carbonate. While ethylene oxide condensate polymers are the most preferred materials, other nonionic, polypolar polymers are not precluded from use in the invention. The expression "polypolar polymers" refers to polymers having a plurality of non-ionized groups whereby said polymers are rendered hydrophilic. Such compounds for use with this invention desirably include polyacrylamide, poly-substituted acrylamides, polyvinyl alcohols, polyvinyl pyrrolidones and polyvinyl oxazolidones, as mentioned above.

Organic polymeric vegetable and cellulosic origin may also be used in the newly invented process covered in this application. These include water soluble or dispersible starches, starch derivatives, dextrans, phosphated starches, Gum Ghatti, Jaguar, Locust Bean Gum, carboxy methyl cellulose, and other well known high molecular weight water soluble vegetable gums and their derivatives.

By the term "water soluble," as applied to the property of the polymers of the invention of being able to be incorporated into aqueous binder systems is meant the ability of being solubilized or dispersed in at least use amounts in the aqueous phase of such systems.

It is not totally understood how the just mentioned polymers or others falling within the defined group of workable materials aid in substantially reducing misting or fogging of sprayed binder solutions or emulsions even when applied in relatively minute amounts. Without polymer present during a spraying operation a pressure drop occurs in which excess energy present actually fractures the liquids into mist or fog. When the polymer is added to the sprayed solution it is believed a visco-elastic effect takes place. That is to say, the polymer-treated liquid actually is deformed in a visco-elastic manner whch allows the energy from the pressure drop to fracture the liquid in a more uniform manner, and prevent formation of very small droplets. This occurs rather than the spray breaking up into a mist pattern. In essence, shock or energy is taken up by a polymer-treated liquid in contradistinction to an untreated solution which is incapable of resisting the shock or energy without substantially changing its rheological characteristics.

The binders include natural rubbers such as gutta-percha, latex, balata, caoutchouc and the like, and the synthetic rubber-like polymers, as for example, copolymers of butadiene with a monoolefinic monomer such as styrene, methylstyrene, dimethylstyrene, acrylonitrile, etc. Other suitable copolymers are methyl, ethyl and butyl acrylates with acrylonitrile, and methyl, ethyl and butyl acrylatestyrene copolymers, the components being so chosen as to proportions so as to produce elastomers. Still other useful materials are plasticized polyvinyl acetate, plasticized polyvinyl chloride, plasticized polystyrene and plasticized substituted polystyrenes as well as polyethylenes and polyisobutylenes.

Other binders which can be employed are alkyd resins as disclosed, for example, in U.S. Pat. No. 3,069,293.

The binder is preferably used in latex form, i.e., as a dispersion in an aqueous medium, usually as an oil-in-water emulsion. The water soluble polymer employed as a drift control agent in accordance with this invention is incorporated into the aqueous phase of the binder-emulsion system. This can be accomplished by using as the aqueous phase of the binder system an aqueous solution prepared by first emulsifying a water soluble drift control polymer to produce a water-in-oil emulsion and then inverting said emulsion into water which contains a water soluble surfactant so that the polymer is released into the water as a solution. This can be accomplished, for example, as described in U.S. Pat. No. 3,624,019. Thus, a typical water-in-oil emulsion containing 28 percent by weight oil and 72 percent by weight water in the liquid phases and 33 percent based on the weight of the emulsion of a polymer containing 30 percent by weight acrylic acid and 70 percent by weight acrylamide inverts to an aqueous solution which can form the aqueous phase of an oil-in-water latex emulsion containing 20 percent solids.

The invention is further illustrated but is not limited by the following example in which the quantities are in parts by weight unless otherwise indicated.

EXAMPLE

Piles of petroleum coke, limestone, sand, slag and ilemite were each sprayed with a binder emulsion containing a 5 percent concentration of a latex made up of 60% SBR latex (containing 20% solids), 32% Velsicol W-167, 5% ethylene glycol and 3% Triton X-100. These emulsions were sprayed on the five different piles of mineral substances with a portable spray rig at 50 pounds per square inch gauge (psig) pressure and at a dosage of 2 pounds of neat product per 100 square feet of area.

Due to the hydrophilic nature of petroleum coke only partial penetration into the pile upon spraying was achieved. A spot check wettability test indicated that 5,000 parts per million (ppm) of a surfactant (Triton X-114) was necessary to wet the coke surface. One pile was pretreated with a 0.5% solution of said surfactant followed by the binder. After overnight drying the piles that were not prewet gave poor superficial binding while the prewet pile gave a good crust ¼ inch thick. It was obvious that the formulation in order to be effective on petroleum coke required better wetting properties.

Additional surfactant (3% based on neat binder) was added to the dilution water prior to make up of the latex binder emulsion and then sprayed on coke pile No. 1. Good penetration was obtained.

To 95 percent of a styrene butadiene elastomer resin latex containing 20% solids and 5% ethylene glycol, 6% Triton X-100 surfactant was added and the resultant composition was sprayed on pile No. 2. Here again good penetration was obtained.

In the foregoing spraying operations there was a considerable amount of drift and in order to control this to the dilution water used in diluting the latex binder there was added 3% Triton X-100 and 0.025 percent of a drift control agent which was a copolymer of 30% acrylic acid and 70% acrylamide having a molecular weight in excess of 100,000. Good drift control and penetration were achieved upon spraying.

Similar tests were carried out using 10 percent concentrations and spraying at 50 psig pressure and a dosage of 2 pounds of neat product per 100 square feet on crushed limestone, slag, sand and ilemite and allowed to dry over night.

After drying over night the piles of mineral substances which had been treated with the drift control agent displayed the best binding character. A thicker and still flexible crust had formed on the coke piles. The limestone, slag, sand and ilemite were firmly bound with the 10 percent concentrated spray.

The quantities of binder in the composition applied to the mineral substances are usually around 10 to 20 percent solids and the rate of application is usually around 1 to 3 pounds of binder solids per 100 square feet of surface area of the mineral substances but this can vary within the range of 0.5 to 15 pounds of binder solids per 100 square feet of surface area.

The quantity of drift control agent should be an amount which is effective for the purpose without substantially altering the nature of the binder composition, for example, by increasing its viscosity or otherwise affecting its physical properties. Usually 250 to 500 ppm of the drift control agent will be effective for the purpose of the invention.

The invention is not limited to the use of any particular kinds of surfactants in the preparation of the binder compositions or in the drift control agents but satisfactory results are obtained by employing surfactants having a mid range HLB value such as, for example, oxyethylated alkyl phenols commercially available under the trade names Triton X-100 and Triton X-114, or octyl phenol oxyethylated with 9 to 10 moles of ethylene oxide.

The pressures used in the spray application are also subject to variation but will usually be within the range of 50 to 300 psig.

It was unobvious to discover that the water soluble polymers formed by the polymerization of at least one monoolefinic compound through an aliphatic unsaturated group and having a molecular weight of at least 100,000 could be employed in an aqueous system of resinous binders in the processing of mineral solids without adversely affecting such a system because the aforesaid water soluble polymers are well known to be useful as coagulants and for the purpose of producing sedimentation of solids suspended in water.

As previously indicated the invention is especially useful in controlling drift of aqeuous systems of resinous binders in the spray application of such systems to mineral solids including, for example, but without limitation, coal, coke, limestone, slag, sand and ilemite.

The ivention is hereby claimed as follows:

1. In a process of controlling drift of aqueous emulsions of resinous binders containing emulsifiers and 10 to 20 percent by weight binder solids in the spray application of such emulsions to mineral solids, the improvement which comprises incorporating into the aqueous emulsions of resinous binder a drift controlling but a substantially non-viscosity increasing amount of a water soluble polyelectrolyte polymer formed by the polymerization of at least one monoolefinic compound through an aliphatic unsaturated group and having a molecular weight of at least 100,000, said polymer having a linear hydrocarbon structure containing in a side chain a hydrophilic group selected from the class consisting of carboxylic acid, carboxylic acid anhydride, carboxylic acid amide, hydroxy, pyridine, pyrrolidone, hydroxyalkyl ether, carboxylic acid salt groups and mixtures of said groups, and constituting 250 to 500 parts per million by weight of said emulsion.

2. A process as claimed in claim 1 in which said water soluble polymer is a copolymer of acrylic acid and acrylamide.

3. A process as claimed in claim 1 in which said mineral solids comprise a substance selected from the group consisting of coal, coke, limestone, slag, sand and ilemite.

* * * * *

UNITED STATES PATENT AND TRADEMARK OFFICE
CERTIFICATE OF CORRECTION

PATENT NO. : 3,876,576
DATED : April 8, 1975
INVENTOR(S) : Raymond J. Michalski

It is certified that error appears in the above-identified patent and that said Letters Patent are hereby corrected as shown below:

Column 2, line 14, "dispesible" should read --dispersible--.

Column 2, line 23 "or" should read --of--.

Column 2, line 31, "pluality" should read --plurality--.

Column 5, line 27, "W-167" should read --W-617--.

Signed and Sealed this sixteenth Day of March 1976

[SEAL]

Attest:

RUTH C. MASON
Attesting Officer

C. MARSHALL DANN
Commissioner of Patents and Trademarks